United States Patent [19]

Moskal

[11] 4,101,483
[45] Jul. 18, 1978

[54] NON-AQUEOUS WATER-DISPLACING SEALANT COMPOSITION FOR VEHICLE GLASS JOINTS

[75] Inventor: John J. Moskal, Garfield Heights, Ohio

[73] Assignee: Premier Industrial Corporation, Cleveland, Ohio

[21] Appl. No.: 792,932

[22] Filed: May 2, 1977

[51] Int. Cl.² ............................................. C08K 5/34
[52] U.S. Cl. ............................. 260/27 BB; 260/27 R; 260/33.6 UA; 252/194; 296/93
[58] Field of Search ............... 260/27 BB, 33.6 UA, 260/27 R; 296/93; 252/194

[56] References Cited

U.S. PATENT DOCUMENTS

| | | | |
|---|---|---|---|
| 2,895,933 | 7/1959 | Höpfner et al. | 260/23.7 M |
| 3,478,475 | 11/1969 | Strack | 296/93 |
| 3,575,463 | 4/1971 | Kolevas | 296/93 |
| 3,654,005 | 4/1972 | Higgins et al. | 296/93 |
| 3,717,600 | 2/1973 | Dalhuisen et al. | 260/23.7 M |

OTHER PUBLICATIONS

J. Adhesion 1974, vol. 6, pp. 177–183–L. A. Akopyan et al.

*Primary Examiner*—V. P. Hoke
*Attorney, Agent, or Firm*—Isler and Ornstein

[57] ABSTRACT

A non-aqueous sealant composition particularly adapted for use in the installation or sealing of fixed glass in vehicles. The composition has a thermoplastic rubber base, suitably modified by plasticizers, tackifyers and a cationic surfactant to provide a sealant system which displaces water from a wetted substrate to which it is applied, permitting it to be utilized under either wet or dry conditions.

21 Claims, No Drawings

NON-AQUEOUS WATER-DISPLACING SEALANT COMPOSITION FOR VEHICLE GLASS JOINTS

BACKGROUND OF THE INVENTION

The automotive repair and service industry is called upon to replace broken glass panels, such as windshields, in vehicles, as well as to find and seal water leaks which may occur in the joints or seams of the vehicles, particularly around the fixed glass installations and similar areas which tend to collect rain or wash water.

A variety of sealant compositions and sealant tapes are used in the automotive industry for original installation of windshields and the like. Such original installation occurs indoors or under cover on a scheduled production basis and under dry conditions.

The automotive repair industry has in its aftermarket activities in glass repair and replacement and in leak detection and sealing used the same variety of sealant compositions which are used by the automotive manufacturing industry. Vehicles are often brought in directly from the rain for immediate service by the customer; or the vehicle may be temporarily parked in an outside lot and be exposed to rain before being brought in for a scheduled repair; or a mobile repair unit may have to make the repair in rainy weather at a remote location. In such situations, the area to which sealant has to be applied is wet and the sealant composition cannot be applied until the area is dried or is permitted to air dry, as satisfactory bond cannot otherwise be achieved.

Similarly, when the repair involves the detection and sealing of a water leak in the vehicle, it is often necessary to spray the suspected joint or seam with water to locate the leak. The area then has to be dried before sealant can be applied thereto. After the sealant has set, a water spray is again used to determine whether the leak has been stopped. If the leak persists, the area again has to be dried, sealant applied, a test water spray applied, and the process repeated until the leak is sealed.

SUMMARY OF THE INVENTION

It is a primary object of the invention to provide a nonaqueous rubber sealant composition which can be used on either wet or dry substrates with complete and satisfactory bond.

It is another object of the invention to provide a sealant composition having the ability and characteristic of displacing the underlying water from the substrate to which the sealant is applied so as to present a substantially water-free surface to which the sealant can adhere.

It is a further object of the invention to provide a sealant composition of the character described in a broad range of viscosity for different methods of application and use.

Other objects and advantages of the invention will become apparent during the course of the following description.

DESCRIPTION OF THE INVENTION

The sealant composition is a non-aqueous homogeneous mixture of the following constituents which are present in the composition as a percentage of the total weight of the listed composition in the range indicated in Table 1 below.

Table 1

| | Constituent | % by weight |
|---|---|---|
| (A) | thermoplastic rubber base | 5 – 20 |
| (B) | liquid plasticizer | 0.5 – 12 |
| (C) | tackifying resin | 1 – 20 |
| (D) | anti-oxidant | 0.1 – 3 |
| (E) | cationic surfactant | 0.25 – 0.70 |
| (F) | inert filler | 0 – 48 |
| (G) | bodying agent | 0 – 5 |
| (H) | hydrocarbon solvent | 20 – 70 |

The thermoplastic rubber base constituent (A) is preferably one or more of the styrene block copolymers, such as styrene-butadiene-styrene or styrene-isoprene-styrene, but can be one of the other known rubbers such as butyl rubber or the like. It is utilized in particle form for better admixture and solution. Mixtures of different rubbers can be utilized for the base to achieve desired properties in the composition.

The plasticizer constituent (B) is preferably an oxidation-resistant balsamic resin or could be one of the heavy aromatic hydrocarbons derived from petroleum and suitable for the purpose.

The tackifyer constituent (C) is preferably a thermoplastic ester derived from pentarythiritol or a polyturpene resin.

The anti-oxidant (D) for the rubber will ordinarily be one of the hindered phenols known to the art for this purpose.

The cationic surfactant constituent (E) is an imidazoline derivative, preferably 1 — hydroxyethyl — 2 alkyl imidazoline.

The filler (F) can be any suitable inert inorganic constituent in powdered form which may be utilized, if desired, to add mass to the composition. Its use in the composition is optional, but is often desirable in attaining desired consistencies or achieving cost reduction of product, as long as its proportion in the composition does not reduce the performance characteristics of the composition below a quality level which will be satisfactory for the particular purpose intended. A commonly used filler is calcium carbonate, but others such as magnesium carbonate could also be used.

Whether or not a bodying agent (G) should be introduced into the composition will depend upon the consistency which is desired for the composition; the extent to which such desired consistency is achieved by other constituents of the composition; the manner and environment in which the composition is to be applied to the substrate; and other factors. A bodying agent which is suitable and commonly used for this purpose is coatings grade asbestos. Other bodying agents, such as fumed silica with thixotropic tendencies, could also be used.

The hydrocarbon solvent (H) is any one or a suitable mixture of aliphatic or aromatic hydrocarbon liquids, such as toluol, naphtha or kerosene.

In addition to the foregoing constituents, it is frequently desirable for the sake of appearance, particularly in the automotive field, that pigment or coloring be added to the composition to achieve a particular color. For example, carbon black or any of the commonly available coloring agents may be added to the composition in such minor proportions as required to achieve the color intensity desired.

All of the mandatory constituents of the composition, as well as those optional constituents selected for inclusion, are thoroughly mixed for a sufficient period of time to obtain complete solution of the soluble constituents and attain a homogeneous mixture of the desired consistency or viscosity.

The resulting sealant compositions can broadly be categorized as light-bodied or heavy-bodied. The light-bodied sealant compositions flow readily when brushed or flowed onto the joint or seam to be sealed and readily penetrate or seep into small openings, such as cracks and crevices, which could be a source of leakage through a substrate joint, for example between a windshield and the automobile pinchwell or molding or even between a windshield and its original bed of sealant. These light-bodied sealant compositions have a Brookfield viscosity ranging from above 100 to about 5000 cps.

The heavy-bodied compositions have a putty-like consistency and are considerably more viscous than the light-bodied sealants. They have a Brookfield viscosity ranging from above 75 thousand to about one million cps. They are generally applied by means of high-pressure dispensing devices to the substrate joint and tend to stay in situ rather than flow readily. After they set, these heavy-bodied compositions still retain an excellent degree of flexibility and resiliency; they have a Shore A Durometer hardness of no more than 50, ranging down to about 30.

It will be understood that the description of the light and heavy-bodied categories above is merely by way of illustration and that the invention also contemplates sealant compositions whose consistency or viscosity would be intermediate the values above given for each category.

The sealant compositions of the invention are themselves non-aqueous and have no significant water absorption tendency, but do have the novel ability to effectively displace the underlying water on the water-wetted substrate surfaces to which the composition is applied. This characteristic permits the sealant to be applied to water-wet surfaces in the joints or seams to be sealed, without the necessity of first drying them. The application of the sealant can be performed in the rain or upon wet surfaces with excellent results. After the sealant has been applied, the joint can be water-tested for leakage without fear of impairing the bond, and more sealant can be applied, if necessary, without waiting for the wet joint to dry. The water-displacing characteristic is independent of the specific gravity or relative density of the sealant composition.

The heavy-bodied sealants preferably have the composition and percentage by weight of constituents indicated in Table 2 below.

Table 2

| | Constituent | % by weight |
|---|---|---|
| (A) | thermoplastic rubber base | 5 – 13 |
| (B) | liquid plasticizer | 0.5 – 7 |
| (C) | tackifying resin | 1 – 15 |
| (D) | anti-oxidant | 0.1 – 3 |
| (E) | cationic surfactant | 0.25 – 0.70 |
| (F) | inert filler | 25 – 48 |
| (G) | bodying agent | 3 – 5 |
| (H) | hydrocarbon solvent | 20 – 50 |

The light-bodied sealants preferably have the composition and percentage by weight of constituents indicated in Table 3 below.

Table 3

| | Constituent | % by weight |
|---|---|---|
| (A) | thermoplastic rubber base | 8 – 20 |
| (B) | liquid plasticizer | 3 – 12 |
| (C) | tackifying resin | 10 – 20 |
| (D) | anti-oxidant | 0.1 – 3 |
| (E) | cationic surfactant | 0.25 – 0.70 |
| (F) | inert filler | 0 – 25 |
| (G) | bodying agent | 0 – 5 |
| (H) | hydrocarbon solvent | 50 – 70 |

As previously indicated, coloring agents in minor amounts may be added to the compositions of Tables 2 and 3.

It is to be noted that the range of the cationic surfactant is critical to achieve homogenity and effectiveness of the composition. Below 0.25% of constituent (E), the composition loses its water-displacing ability and will not satisfactorily perform on water-wetted substrates. When constituent (E) exceeds 0.7% by weight, the composition becomes water-absorbent and there is a precipitation effect causing constituent separation and destroying the homogeneous character of the composition.

In general the heavy-bodied sealant compositions of Table 2 contain higher proportions of filler (F) and bodying agent (G) and less solvent (H) than do the light-bodied sealants of Table 3.

Six specific examples of representative sealant compositions according to the invention are set forth in Table 4 below.

Table 4

| | Constituent | Percentage by weight | | | | | |
|---|---|---|---|---|---|---|---|
| | | Example I | Example II | Example III | Example IV | Example V | Example VI |
| (A) | Thermoplastic rubber base | 8.5 | 10.0 | 10.5 | 12.6 | 9.3 | 16.4 |
| (B) | Plasticizer | 6.6 | 6.4 | 3.5 | 1.7 | 3.6 | 6.3 |
| (C) | Tackifying Resin | 7.0 | 2.0 | 12.0 | 12.7 | 17.5 | 14.0 |
| (D) | Anti-oxidant | 0.1 | 0.1 | 0.1 | 0.1 | 0.1 | 1.5 |
| (E) | Cationic surfactant | 0.6 | 0.5 | 0.6 | 0.6 | 0.3 | 0.25 |
| (F) | Filler | 37.8 | 40.5 | 44.1 | 46.7 | — | — |
| (G) | Bodying agent | 3.8 | 5.0 | 3.4 | 3.6 | — | 2.7 |
| (H) | Solvent | 35.6 | 30.8 | 23.7 | 22.0 | 68.7 | 58.85 |
| (I) | Pigment or coloring | — | 4.7 | 2.1 | — | 0.5 | — |
| | | 100.0 | 100.0 | 100.0 | 100.0 | 100.0 | 100.0 |
| | Approximate Brookfield Viscosity | 100,000 cps | 150,000 cps | 800,000 cps | 1,000,000 cps | 135 cps | 400 cps |
| | Approximate Shore A Durometer | 45 | 48 | 50 | 50 | — | — |

Examples I through IV can be categorized as heavy-bodied. Examples III and IV are of a consistency and character particularly adapted for use where an entire windshield or other fixed glass insert has to be replaced and reset in a vehicle. Examples I and II are of a consistency and character particularly adapted for use in rehabilitating an existing joint where the sealant has suffered cracking, embrittlement or other general deterioration.

Examples V and VI can be categorized as extremely light-bodied. They can be flowed on easily for rapid penetration in localized areas of the joint, such as pin holes and the like, and can otherwise be utilized where relatively thin layers of flowable sealant are needed or desirable.

Having thus described my invention, I claim:

1. A non-aqueous, water-displacing sealant composition for application to vehicle glass joints and the like, comprising a homogeneous mixture of:
   (A) from 5% to 20% by weight of a thermoplastic rubber base, and
   (B) from 0.5% to 12% by weight of a liquid plasticizer selected from the group consisting of oxidation-resistant balsamic resins and aromatic hydrocarbons, and
   (C) from 1% to 20% by weight of a tackifying resin, and
   (D) from 0.1% to 3% by weight of an anti-oxidant for rubber, and
   (E) from 0.25% to 0.70% by weight of a cationic surfactant selected from the group consisting of imidazoline derivatives, and
   (F) from zero to 48% by weight of inert inorganic solids as fillers, and
   (G) from zero to 5% by weight of a bodying agent, and
   (H) from 20% to 70% by weight of a liquid solvent selected from the group consisting of aliphatic and aromatic hydrocarbons, and said composition being essentially free of water and being characterized by its ability to displace water, without absorption thereof into the composition, from a water-wetted substrate to which said sealant is applied.

2. A composition according to claim 1, wherein (A) is a styrene block copolymer.

3. A composition according to claim 1, wherein (A) is butyl rubber.

4. A composition according to claim 2, wherein (A) is a styrene-butadiene-styrene block copolymer.

5. A composition according to claim 2, wherein (A) is a styrene-isoprene-styrene block copolymer.

6. A composition according to claim 1, wherein (C) is a thermoplastic ester resin derived from pentaerythritol.

7. A composition according to claim 1, wherein (C) is a polyterpene resin.

8. A composition according to claim 1, wherein (D) is a hindered phenol.

9. A composition according to claim 1, wherein (E) is a 1-hydroxyethyl-2 alkyl-imidazoline.

10. A composition according to claim 1, wherein (F) is powdered calcium carbonate.

11. A composition according to claim 1, wherein (G) is selected from the group consisting of asbestos and fumed silicas with thixotropic characteristics.

12. A composition according to claim 1, wherein (H) is naphtha.

13. A composition according to claim 1, having a Shore A Durometer hardness of no more than 50.

14. A composition according to claim 13, having a Brookfield viscosity greater than 100 cps.

15. A composition according to claim 1, wherein the constituent:
   (A) is from 5% to 13% by weight, and
   (B) is from 1.5% to 7% by weight, and
   (C) is from 1% to 15% by weight, and
   (F) is from 25% to 48% by weight, and
   (G) is from 3% to 5% by weight, and
   (H) is from 20% to 50% by weight.

16. A composition according to claim 15, having a Brookfield viscosity of more than 75,000 cps.

17. A composition according to claim 15, wherein the constituent:
   (A) is about 8.5% by weight, and
   (B) is about 6.6% by weight, and
   (C) is about 7.0% by weight, and
   (D) is about 0.1% by weight, and
   (E) is about 0.6% by weight, and
   (F) is about 37.8% by weight, and
   (G) is about 3.8% by weight, and
   (H) is about 35.6% by weight.

18. A composition according to claim 1, wherein the constituent:
   (A) is from 8% to 20% by weight, and
   (B) is from 3% to 12% by weight, and
   (C) is from 10% to 20% by weight, and
   (F) is from zero to 25%, and
   (H) is from 50% to 70% by weight.

19. A composition according to claim 18, having a Brookfield viscosity of less than 5000 cps.

20. A composition according to claim 18, wherein the constituent:
   (A) is about 16.4% by weight, and
   (B) is about 6.3% by weight, and
   (C) is about 14.0% by weight, and
   (D) is about 1.5% by weight, and
   (E) is about 0.25% by weight, and
   (F) is zero, and
   (G) is about 2.7% by weight, and
   (H) is about 58.85% by weight.

21. A composition according to claim 17, with the addition of a minor proportion of a coloring ingredient for the composition.

* * * * *